No. 890,857. PATENTED JUNE 16, 1908.
W. S. HADAWAY, Jr.
CULINARY APPARATUS.
APPLICATION FILED SEPT. 26, 1907.
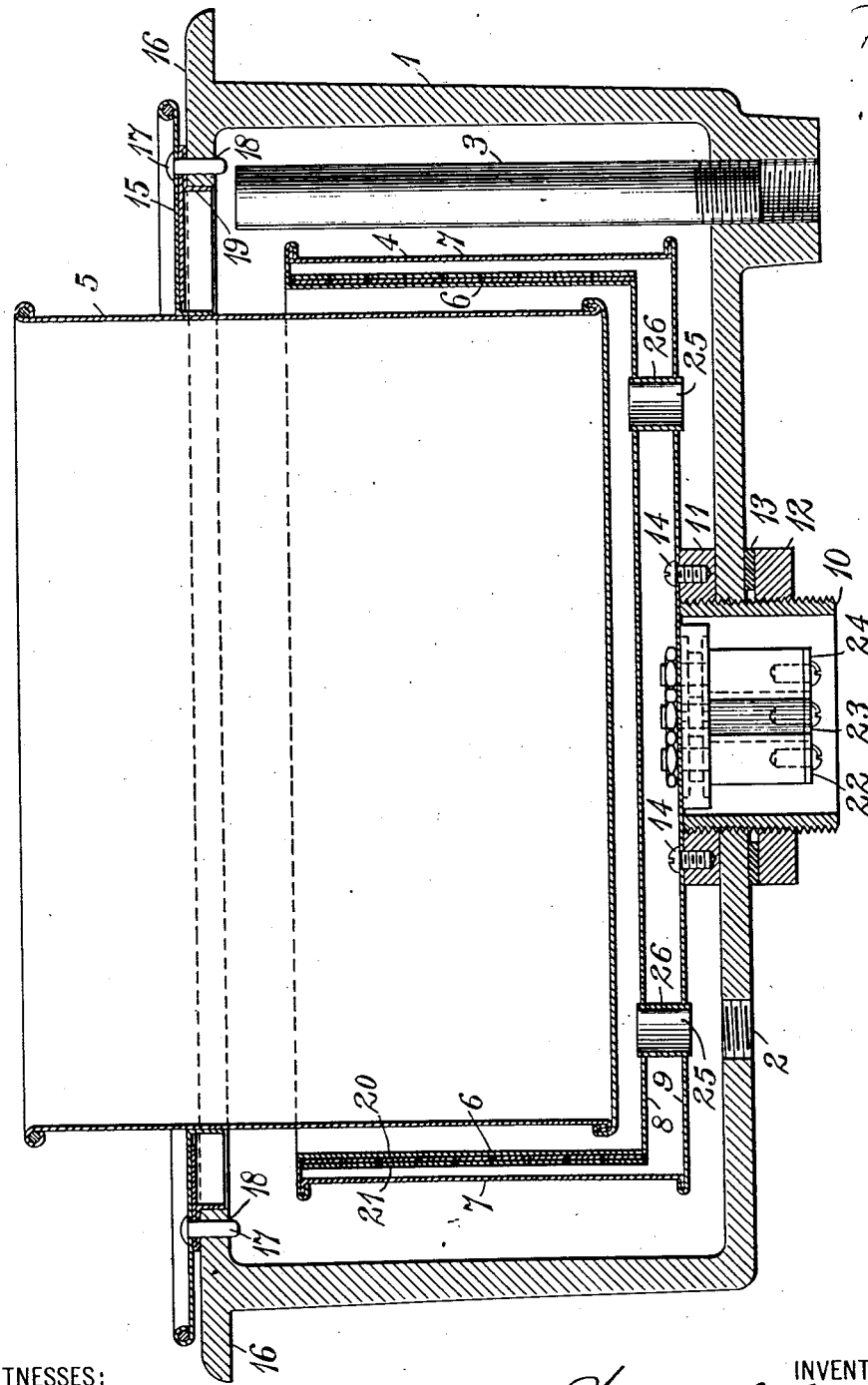

UNITED STATES PATENT OFFICE.

WILLIAM S. HADAWAY, JR., OF EAST ORANGE, NEW JERSEY, ASSIGNOR TO HADAWAY ELECTRIC HEATING & ENGINEERING COMPANY, A CORPORATION OF NEW YORK.

CULINARY APPARATUS.

No. 890,857.  Specification of Letters Patent.  Patented June 16, 1908.

Application filed September 26, 1907. Serial No. 394,744.

*To all whom it may concern:*

Be it known that I, WILLIAM S. HADAWAY, Jr., a citizen of the United States, and a resident of East Orange, in the county of Essex and State of New Jersey, have invented a new and useful Improvement in Culinary Apparatus, of which the following is a specification.

My invention relates to culinary apparatus and similar devices and has special reference to electrically heated fluid-containing vessels.

The object of my invention is to provide means for rapidly and economically heating water or other liquids for the purpose of applying a relatively high initial heat to an inner receptacle and for afterwards maintaining a moderate temperature for a considerable length of time.
In the manufacture of bonbons and other candy it is desirable to immerse the vessel containing the sugar in water and heretofore a considerable length of time was necessarily occupied in bringing the entire volume of water to its boiling point.

According to my present invention, I provide a device to which heat is applied electrically so as to obtain, in a relatively short time, a high heat for melting the sugar or other material contained in an inner receptacle, the molten material being maintained at a substantially constant temperature for an indefinite period thereafter by a minimum expenditure of energy.
The single figure of the accompanying drawing is a sectional elevation of a heating or cooking device constructed in accordance with my invention.

Referring to the drawing, the device illustrated comprises an outer receptacle, or pot 1, having an inlet port 2 and an overflow pipe 3, a second vessel 4, which is supported within the vessel 1, and a third or inner vessel 5 which is suspended within the vessel 4.
The intermediate vessel 4 is provided with a double peripheral wall 6—7 and a double bottom 8—9 preferably constructed of plates of copper or other suitable conducting material. The construction of this member is such that a fluid tight compartment is formed and is so disposed relative to the pot 1 that its outer walls are separated at all points from the inside walls of the pot.

A short section of relatively large pipe 10 is screw-threaded into the bottom of the pot 1 and is held in position by set nuts 11 and 12, the outer nut being separated from the wall of the pot by a rubber gasket 13. The inner nut 11 forms a support for the vessel 4, the bottom plate 9 of this vessel being secured thereto by screws 14.

The inner vessel 5 is provided with a flange 15 which projects laterally over a rim 16 of the pot 1 and serves to support the innermost vessel. A plurality of studs 17 projects downwardly from the flange 15 and, under normal operating conditions, engage holes 18 in the rim 16. On account of the overflow pipe 3, it is desirable to mount the intermediate vessel a little to one side of the center of the pot 1 and, since it is specially desirable to maintain a concentric relation between the vessels 4 and 5, an eccentric guide ring 19 is fitted into the opening of the pot, the inner hole in the ring being concentric with the intermediate vessel 4.

Electric heating coils 20 and 21 are wound one over the other adjacent to the inner wall 6 within the fluid tight compartment of the intermediate vessel 4. The leads of the coils 20 and 21 are connected to terminals 22, 23, and 24 which project through the bottom plate 9 and are disposed within the short length of pipe 10 so that the circuit connections of the two coils may be varied from without. Small passages 25 are provided through the bottom of the intermediate vessel by sleeves 26 so that the level of the liquid in the pot 1 is the same both inside and outside of the vessel 4.

The operation of the device is as follows: Sugar or other material to be melted is placed in the vessel 5 and the pot 1 is filled with water to a level slightly above the top of the intermediate vessel 4. In order to melt the sugar as soon as possible the vessel 5 is raised and is supported by the studs 17 which are allowed to rest on the rim 16 of the pot, instead of engaging the holes 18, in order to lower the level of the liquid in the pot below the edge of the intermediate vessel 4. Electric energy is then supplied to the inner heating coil 20, which is preferably connected directly across the line at this time, and the heat thus generated will be transmitted directly through the conducting wall 6, since a film of air or other heat insulator is interposed between the heating coil and the conducting wall 7. The volume of water contained in the intermediate vessel 4 is relatively small so that its temperature will soon be raised to the boiling point by reason of the fact that a free circulation with the main volume of water is prevented. As soon as the sugar is melted, the inner vessel 5 may be lowered into its normal position by permitting the studs 17 to enter the holes 18, thereby raising the level of the water in the pot 1 above the edge of the intermediate vessel and thereby permitting a free circulation of the liquid. The heating coils 20 and 21 are then preferably connected in series across the supply circuits so that less energy is supplied to them, and the sugar will be maintained in a molten condition without any danger of burning.

My improved device may, of course, be employed for various purposes, and modifications in the size and arrangement of details may be effected within the scope of my invention.

I claim as my invention:

1. In a heating device, the combination with a fluid-containing vessel, a second vessel within said fluid-containing vessel, a third vessel suspended in the second vessel, and means for supporting the third vessel at different heights, of means for heating the inside wall of the second vessel.

2. In a heating device, the combination with a fluid-containing vessel, a second vessel within said fluid-containing vessel having double walls to form a fluid-tight compartment in the first vessel, a third vessel suspended within the second vessel and means for supporting the third vessel at different heights to raise the liquid level in the first vessel above and to permit it to sink below the edge of the second vessel, of electric heating coils within the fluid tight compartment and adjacent to its inside wall.

3. In a culinary device, the combination with a fluid-containing outer receptacle having an inlet port and an over-flow pipe, an inner receptacle, and means for suspending the same at different heights within the outer receptacle and an intermediate partition of heat-insulating material which forms a relatively thin film of liquid about the inner receptacle, of means dependent upon the position of the inner receptacle for either permitting or preventing a free circulation between the liquid film and the body of the liquid in the outer receptacle.

4. In a culinary device, the combination with a fluid-containing pot or receptacle having an inlet port and an over-flow pipe, a sleeve fitted into the bottom of the receptacle, a second vessel located within the first vessel and secured to the inner end of the sleeve and a third vessel suspended within the second vessel to form a thin liquid film between its outer wall and the intermediate vessel, and means for supporting the inner vessel at different heights, of electric heating coils located adjacent to the inner wall of the intermediate vessel, and means dependent upon the position of the inner receptacle for either permitting or preventing a free circulation between the liquid film and the body of the liquid in the outer receptacle.

In testimony whereof, I have hereunto subscribed my name this 12th day of September, 1907.

WILLIAM S. HADAWAY, Jr.

Witnesses:
HAROLD B. TAYLOR,
GRANT FREEMAN.